(12) United States Patent
Bullock et al.

(10) Patent No.: US 7,085,117 B2
(45) Date of Patent: Aug. 1, 2006

(54) EMC IMMUNITY IMPROVEMENTS TO USB INTERFACE

(75) Inventors: Randolph Bullock, Dryden, NY (US); James R. Del Signore, Trumansburg, NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 329 days.

(21) Appl. No.: 10/677,528

(22) Filed: Oct. 2, 2003

(65) Prior Publication Data

US 2005/0073792 A1    Apr. 7, 2005

(51) Int. Cl.
    *H02H 3/22* (2006.01)
(52) U.S. Cl. .......................... 361/111; 361/90
(58) Field of Classification Search ................ 361/111
    See application file for complete search history.

(56) References Cited

U.S. PATENT DOCUMENTS

| | | | |
|---|---|---|---|
| 4,571,656 A * | 2/1986 | Ruckman | 361/56 |
| 5,956,158 A * | 9/1999 | Pinzarrone et al. | 358/474 |
| 6,101,076 A * | 8/2000 | Tsai et al. | 361/90 |
| 6,452,269 B1 * | 9/2002 | Ohbayashi | 257/734 |
| 6,937,454 B1 * | 8/2005 | Mikolajczak et al. | 361/111 |

* cited by examiner

*Primary Examiner*—Brian Sircus
*Assistant Examiner*—Luis Roman
(74) *Attorney, Agent, or Firm*—George R. McGuire; Bond, Schoeneck & King, PLLC

(57) ABSTRACT

A USB interface having improved EMC immunity where the D+, D−, and USB ground lines each pass through a common mode choke. The USB 5V line is AC coupled to the USB ground line outside the choke and routed through a high impedance into the circuit while maintaining the integrity of the signal. In addition, bypass capacitors, such as Tantalum bypass capacitors, and a 5.6V Transorb device are added to the 5V power supply of the controller, and all unused pins are terminated to reduce unwanted ringing transients in the controller leadframe. In addition, small capacitors within the capacitive loading specification allowed by the USB-IF are positioned next to the controller on each data line.

12 Claims, 2 Drawing Sheets

EMC IMMUNITY IMPROVEMENTS TO USB INTERFACE

BACKGROUND OF THE INVENTION

1. Field of Invention

The present invention relates to hardware designed for electromagnetic compatibility (EMC) immunity and, more specifically, to a standard Universal Serial Bus (USB) interface having improved EMC.

2. Description of Prior Art

Universal Serial Bus, or USB, architecture is becoming a popular substitute for parallel or serial bus architecture, and USB ports, in addition to parallel and serial ports, are provided as standard equipment on most computers manufactured today. USB specifications are available at the URL http://www.usb.org.

USB requires a single pair of twisted wires in a cable for data transmission, while a second pair provides power from a host to a peripheral unit. Three signaling conditions are utilized. Data packets are sent using differential signaling followed by an end of packet, where both lines go low for two clocks. A third state is the idle state where neither line is driven, but one is pulled up by a resistor at the device end. The host controls the packet flow such that when the peripheral is sending data, the host is in receive mode, and vice-versa, and no collisions are possible.

While the USB interface has brought more flexibility, packetized data integrity, and automatic configuration to PC-connected peripherals, the interface defined by the USB-Integrator's s Forum (USB-IF) has inherent deficiencies in meeting today's European Norm (EN) EMC immunity requirements. Although the published USB standards (Rev. 1.1 or 2.0) require all devices bearing the USB logo to meet today's EN requirements for "CE" mark, very few commercially available USB peripherals actually do so on the immunity side. The forum for acceptance of USB devices, known as "Plugfest," focuses primarily on the functional aspects of compliance to the USB standard in terms of link level protocols and signal integrity, neglecting the CE mark EMC requirements invoked in the USB standard.

Under the broad term EMC Immunity, as defined in EN55024, are specific tests such as ESD, EFT, RFI, and CRFI that apply and are required to meet CE mark. In particular peripheral markets, namely peripherals for use in a point of sale environment, such as POS-printers, the standard CE mark tests are required, but at higher voltage treatment levels. As such, EMC immunity can quickly become the major obstacle in the use of USB in a POS environment. Due to these higher level Immunity requirements, POS has been accurately depicted as an industrial level of Immunity.

In terms of ESD immunity, because the USB device controller is connected to the physical interface conductors and contains RAM registers that can be easily upset by large ESD-induced signal transients, immunity to ESD is inherently poor. In terms of EFT immunity, some of the same problems as with ESD are encountered, except that instead of altered logic states, either the Early End of Packet (Early EOP) or Babble are caused due to poor recovery mechanisms in the hardware.

The reason these conditions are reached during EFT testing is an unlucky choice of Start Of Frame (SOF) packet interval at an exact harmonic of the likewise arbitrary pulse frequency chosen by the EFT committee as the basis for the EFT test. Without improving basic signal robustness or cabling, a choice of slightly different SOF interval would eliminate the chance of having several SOF packets in a row lost to interference during EFT testing. In fact, a 1 ms SOF interval ensures that eventually, up to 15 SOF in a row will be lost to a 15 ms burst of 5 KHz energy injected on either the signal cable or AC mains to the POS-device (i.e., printer) during the EFT test, which will likely result in a disconnected device having no fully USB-compliant method of automatic reconnection.

While use of common mode chokes are known to control fault currents in lower speed electronic interfaces, their use is expressly not recommended by the USB-IF in USB interfaces, presumably due to the topology and signaling methods used in USB.

3. Objects and Advantages

It is therefore a principal object and advantage of the present invention to provide improved EMC immunity is a USB interface.

It is an additional object and advantage of the present invention to provide improved EMC immunity while not degrading signal integrity.

Other objects and advantages of the present invention will in part be obvious, and in part appear hereinafter.

SUMMARY OF THE INVENTION

In accordance with the foregoing objects and advantages, the present invention provides a device for improving EMC immunity in a USB interface while maintaining the integrity of the signal. The invention generally comprises use of a common mode choke through which each of the USB's four signal lines pass. The choke operates by passing the signal lines through a common coupling ferrite core, allowing the fault current to pass by on the shield uninhibited while blocking common-mode currents with ferrite impedance much stronger than could be tolerated on each signal data line individually. In addition, bypass capacitors, such as Tantalum bypass capacitors, and a 5.6V Transorb device are added to the 5V power supply of the controller, and all unused pins are terminated to reduce unwanted ringing transients in the controller leadframe. In addition, small capacitors (within the capacitive loading specification allowed by the USB-IF) are positioned next to the IC on each data line. In an alternative embodiment, the D+, D−, and USB ground lines each pass through the choke, and the USB 5V line is AC coupled to the USB ground line outside the choke and routed through a high impedance into the circuit, although this structure would not be practical for bus-powered devices which would need all four lines to pass through the choke.

DETAILED DESCRIPTION

Figure 1:
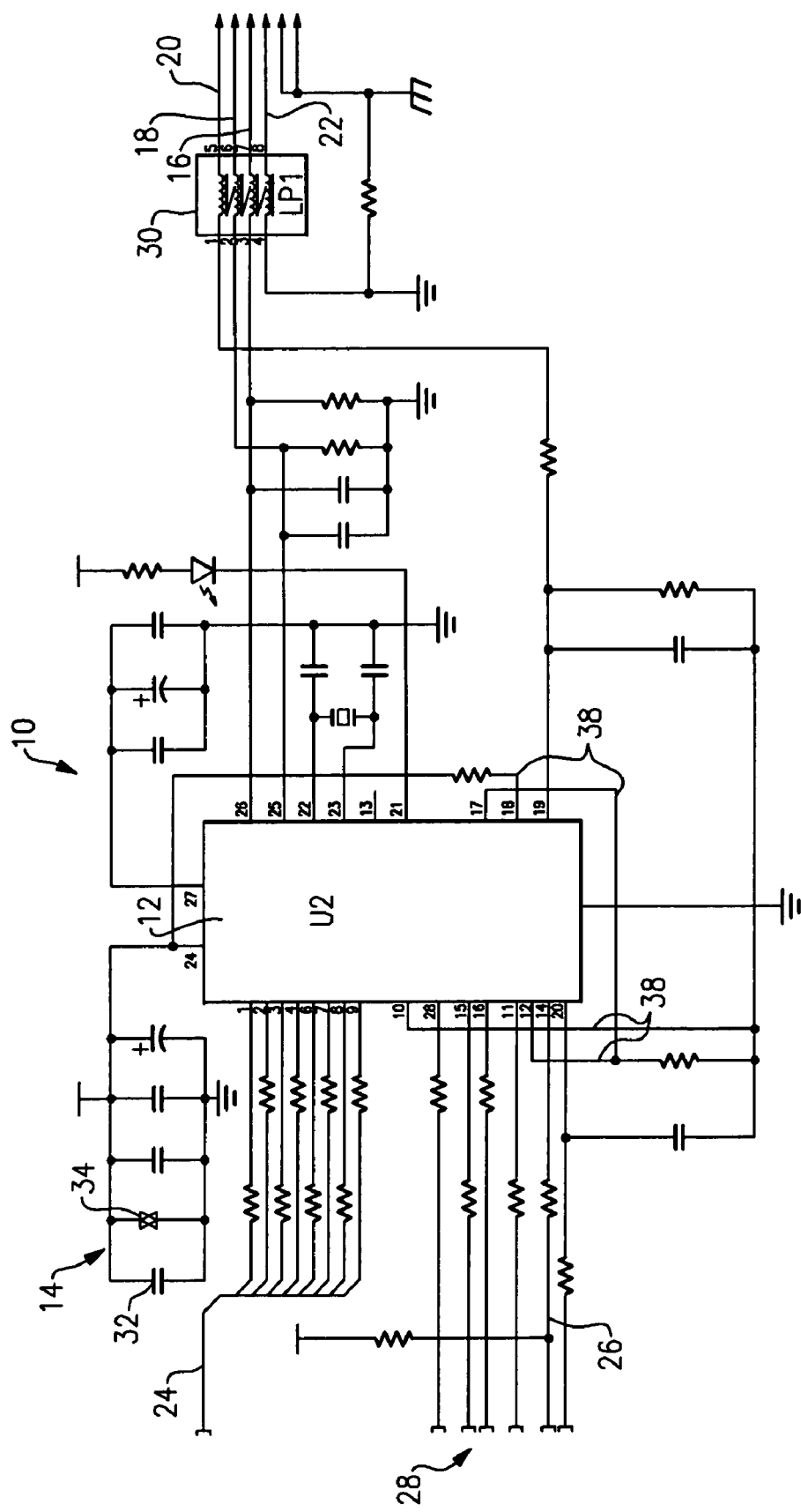
FIG. 1 is a schematic of a USB interface modified in accordance with the preferred embodiment of the present invention.

Referring now to the drawing figures in which like reference numerals refer to like parts throughout, there is seen a Universal Serial Bus (USB) interface, referred to generally by reference numeral 10, that includes a USB Serial Interface Engine/Controller 12 for controlling communications flowing between a host computer and a peripheral, such as a printer. Interface 10 additionally comprises a power supply 14, four signal lines 16, 18, 20, 22 designated D+, D−, USB5V, and USB ground, respectively, (D+ and D− being data carrying wires and USB 5V and USB ground providing power between the computer and peripheral), an 8-bit data bus 24, status pins 26, and miscellaneous bus control signals 28.

Referring to FIG. 1, interface 10 further comprises a choke 30, through which signal lines 16, 18, 20, and 22 pass for purposes of improving EMC immunity. Choke 30 preferably comprises a ferrite core with inductors positioned therein that permit the lines 16–22 to pass therethrough while neglecting shield and permitting fault currents to pass by on the shield uninhibited while blocking common mode currents with ferrite impedance much stronger than could be tolerated on each data line individually. Power source 14 contains bypass capacitors 32, such as Tantalum bypass capacitors, and a 5.6V transorb device 34. All unused pins 38 are terminated to reduce ringing transients in the controller lead frame.

Figure 2:
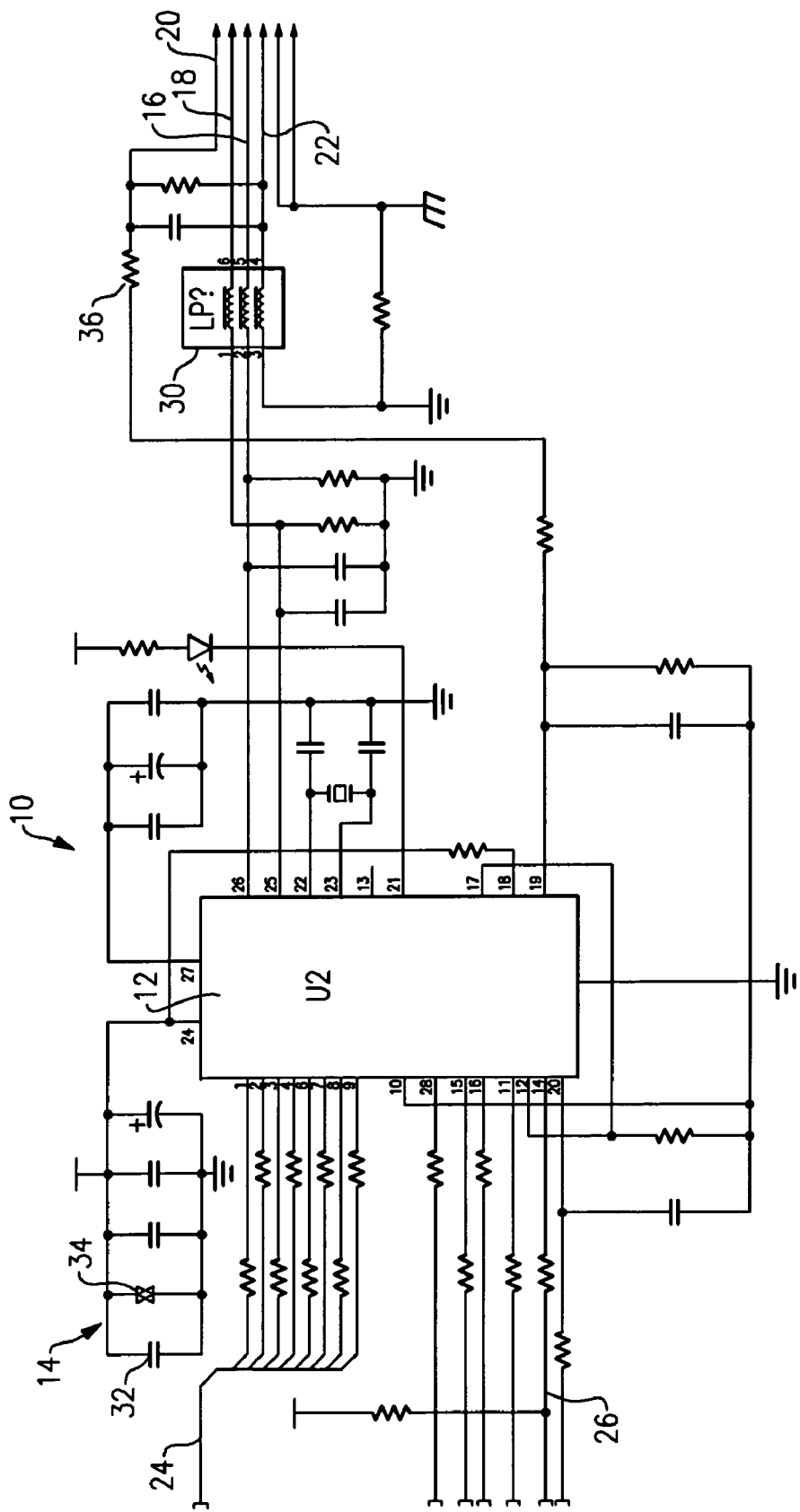
FIG. 2 is a schematic of a USB interface modified in accordance with an alternate embodiment of the present invention.

Referring to FIG. 2, an alternate embodiment of interface 10 comprises a choke 30, through which signal lines 16, 18, and 22 pass. USB 5V line 20 is AC coupled to USB ground line 22 outside of choke 30 and routed through high impedance 36.

As seen in FIGS. 1 and 2, USB 5V line 20, the reset input, and strobe output 26, 28 are filtered by RC networks to prevent transients from inducing modified signal states in either the controller 12 or host microprocessor.

What is claimed is:

1. In a universal serial bus (USB) interface, an improvement for electromagnetic compatability (EMC) immunity comprising:
   a. a controller including first and second data lines, a power line, and a ground line;
   b. a choke comprising a ferrite core through which said first and second data lines and said ground line pass; and
   c. wherein said power line is AC coupled to said ground line outside said choke and routed through high impedance.

2. The improvement of claim 1, wherein said controller further includes a plurality of communication pins.

3. The improvement of claim 1, wherein each of said plurality of communication pins is terminated.

4. The improvement of claim 1, further compromising a power source having a bypass capacitor and a transorb device.

5. The improvement of claim 1, wherein said first and second lines are terminated by capacitors.

6. The improvement of claim 1, wherein said power line is routed through high impedance.

7. The improvement of claim 1, said controller further including a reset input and a strobe output, wherein said power line, said reset input, and said strobe output are filtered by RC networks to prevent transients from inducing modified signal states.

8. In a universal bus (USB) interface including a serial interface controller, an improvement for EMC immunity comprising:
   a. a single USB channel comprising first, second, and third signal lines interconnected to said controller;
   b. a fourth signal line; and
   c. a choke comprising a ferrite core through which each of said first, second, third, and fourth signal lines pass.

9. The improvement of claim 8, wherein said controller further includes a plurality of communication pins.

10. The improvement of claim 9, wherein each of said plurality of communication pins is terminated.

11. The improvement of claim 8, further comprising a power source having a bypass capacitor and a transorb device.

12. The improvement of claim 8, wherein said first and second lines are terminated by capacitors.

* * * * *